United States Patent [19]

Zahlaus

[11] Patent Number: 4,682,538
[45] Date of Patent: Jul. 28, 1987

[54] PROCESSING OF CURD

[75] Inventor: Alfred Zahlaus, Modena, Italy

[73] Assignee: Alfa-Laval Cheese Systems Limited, Somerset, England

[21] Appl. No.: 795,312

[22] Filed: Nov. 5, 1985

[30] Foreign Application Priority Data

Nov. 9, 1984 [IT] Italy ................................ 23512 A/84

[51] Int. Cl.$^4$ ............................................. A01J 25/00
[52] U.S. Cl. ...................................... 99/453; 99/460; 99/464; 99/489; 99/494
[58] Field of Search ............................ 99/494, 452–454, 99/460, 464, 466, 516, 535; 118/16, 18, 30, 24, 25; 222/55

[56] References Cited

U.S. PATENT DOCUMENTS

| | | | |
|---|---|---|---|
| 3,154,002 | 10/1964 | Budahn | 99/453 |
| 3,707,769 | 1/1973 | Syrjanen | 99/452 |
| 4,448,116 | 5/1984 | Muzzarelli | 99/460 |
| 4,611,555 | 9/1986 | Burford | 118/25 X |

FOREIGN PATENT DOCUMENTS 2237569 2/1975 France .................................. 99/494

Primary Examiner—Timothy F. Simone
Attorney, Agent, or Firm—Davis, Hoxie, Faithfull & Hapgood

[57] ABSTRACT

Apparatus for adding salt to a continuous stream of hot glutinous curd in the manufacture of Pasta Filata cheese, comprises an open-ended trough for passage therethrough of the stream of curd, a measuring roller rotatably mounted on a swing frame pivotally mounted on the trough with the roller in rolling engagement with the top of the curd, electrical means measuring the angle of the swing frame and the rotational speed of the roller so as to provide an output corresponding to the volumetric rate of flow of curd along the trough, and a vibratory conveyor supplying salt to the curd at a rate corresponding to the output of the electrical measuring means. The salt is mixed into the curd by power driven roller discs which project into the curd in the trough and draw the curd along the trough upon rotation of the roller discs.

12 Claims, 3 Drawing Figures

PROCESSING OF CURD

FIELD OF THE INVENTION

This invention relates to the processing of curd by the addition of salt in the manufacture of cheese, and is particularly but not exclusively applicable to the manufacture of Pasta Filata cheeses, an example of which is Mozzarella.

Pasta Filata cheeses are made from curd which has been kneaded, stretched, and cooked by hot water, to form a hot glutinous mass. Salt is added to the mass of curd which is then deformed by plungers so as to reshape the curd and thereby distribute the salt within the curd, and the salted curd fed into moulds to form individual blocks of curd which are subsequently cooled by cold water to surface-harden the blocks of curd. In the manufacture of Pasta Filata cheeses on a commercial scale, the kneading, stretching and cooking operations are carried out in machines designed to produce a continuous stream of the hot glutinous curd which is then passed through apparatus designed to feed salt continuously onto the moving stream of curd. The object of the invention is to provide apparatus for processing a moving stream of curd by the addition of salt at a rate corresponding to the rate of flow of the curd so as to obtain a predetermined ratio of salt to curd throughout the stream of curd, and thereby insure that the cheese will be of the desired quality.

DESCRIPTION OF THE RELATED ART

In prior known apparatus for salting a continuous stream of curd in the commercial manufacture of cheese, the curd is generally supported on a belt conveyor and the rate of supply of salt is controlled by the speed of the belt and/or the thickness of the curd, as is shown for example in the prior patent specification GB No. 1318863; Australian No. 11945/76; U.S. Pat. No. 2,942,343 and French Nos. 1149903, 829534.

SUMMARY OF THE INVENTION

According to the present invention there is provided a method of processing curd by the addition of salt in the manufacture of cheese, comprising passing the curd in a continuously moving stream along a path, supporting a roller on the moving stream of curd with the roller free to rotate in response to the movement of the curd along the path, providing a first signal corresponding to the height of the roller above the path and a second signal corresponding to the rotational speed of the roller, providing an output from said signals corresponding to the volumetric rate of flow of curd along the path, and supplying salt to the curd at a rate corresponding to said output.

In the manufacture of Pasta Filata cheeses, the curd to be processed is preferably extruded through an orifice onto a trough having a width substantially equal to that of the orifice, so that the curd extends across the full width of the trough and the stream of curd has a substantially constant cross section. The base of the trough then forms the above mentioned path. The orifice can conveniently be adjustable to vary its cross sectional area so as to accommodate different rates of flow of the curd. The curd flowing along the trough is preferably deformed, after the addition of salt thereto, so as to mix the salt with the curd. The curd can conveniently be deformed by a plurality of power driven roller discs which project into the curd and are adapted to draw the curd along the trough upon rotation of the roller discs.

According to the invention there is also provided apparatus for processing curd by the addition of salt in the manufacture of cheese, comprising an open-ended trough for the passage of a stream of curd to be salted, a roller supported on the curd in the trough and in rolling engagement with the curd, means for providing a first signal corresponding to the height of the roller above the base of the trough and hence to the depth of the curd, means for providing a second signal corresponding to the speed of rotation of the roller and hence to the speed of travel of the curd along the trough, and means controlled by said signals for adding salt to the curd at a rate dependent upon the volumetric rate of flow of curd along the trough.

In the manufacture of Pasta Filata cheeses the apparatus preferably includes power-driven rotary discs which are spaced apart across the trough downstream of the salting means, the discs being arranged to draw the curd along the trough and to deform the curd so as to distribute the salt within the curd upon rotation of the discs. The trough is preferably inclined downwards in the direction of flow of the curd along the trough.

The roller is preferably mounted on a swing frame pivotally mounted on the trough. The means providing the first signal can then conveniently be an electrical potentiometer providing an output corresponding to the angular setting of the swing frame relative to the trough. The means providing the second signal corresponding to the speed of rotation of the roller can conveniently be mounted on the swing frame. The means for adding salt to the curd can conveniently be a vibratory conveyor driven by an electric motor, the output of the conveyor being controlled by the speed of the motor and the speed of the motor being controlled by said signals.

BRIEF DESCRIPTION OF THE DRAWINGS

Apparatus for the processing of curd by the addition of salt in accordance with the method of the invention, in the manufacture of Mozzarella cheese, will now be described by way of example with reference to the accompanying drawings, in which.

DESCRIPTION OF THE PREFERRED EMBODIMENT

Figure 1:
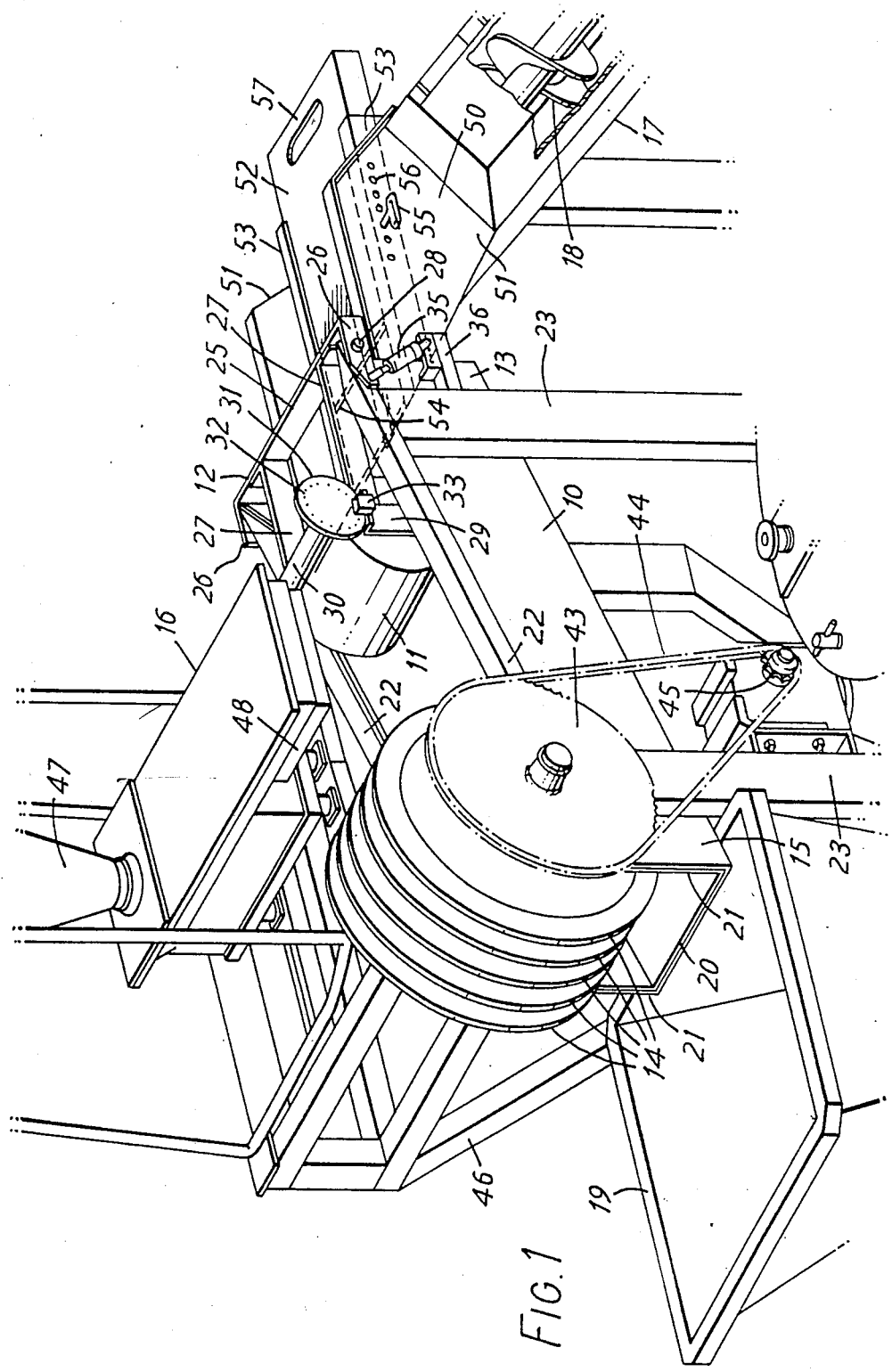
FIG. 1 is a perspective view of the apparatus, together with part of a feed duct for supplying curd to the apparatus and a hopper for reception of the salted curd.

The apparatus shown in the drawings comprises an open-ended trough 10 for passage therethrough of a stream of curd to be salted, a measuring roller 11 rotatably mounted on a swing frame 12 pivotally mounted on a trough at the upstream end 13 thereof, the roller 11 being arranged to be in rolling engagement with the curd in the trough, a set of roller discs 14 rotatably mounted on the trough adjacent the downstream end 15 thereof, the roller discs being arranged to deform curd passing through the trough, and a vibratory conveyor 16 for supplying salt to curd in the trough between the measuring roller 11 and the roller discs 14. A feed duct 17 has augers 18 operable to feed curd to the upstream end 13 of the trough, and a hopper 19 is arranged to receive salted curd from the downstream end 15 of the trough.

The trough 10 comprises a channel-shaped member having a flat base 20 and two vertical walls 21 the upper edges of which are turned outwards and downwards to form two side rails 22 on opposite sides of the trough. The two side rails 22 engage around the upper ends of four legs 23 which support the trough with the base 20 inclined downwards from the upstream end 13 to the downstream end 15. The inside surfaces of the trough 10 are lined with sheets of stainless steel.

The swing frame 12 comprises a cross bar 25 which extends across the upstream end 13 of the trough, the end portions of the cross bar being turned in the downstream direction to form a pair of outer arms 26 on the outside of the side rails 22 of the trough, and a pair of inner arms 27 which are welded to the cross bar and extend in the downstream direction on the inside of the two side rails 22. Each of the outer arms 26 is pivotally connected intermediate its ends at 28 to the adjacent side rail 22 so that the swing frame 12 is free to pivot about a horizontal axis transverse to the longitudinal axis of the trough. The swing frame 12 also includes two upright members 29 the centre portions of which are welded one to each of the inner arms 27 adjacent the free ends thereof. The measuring roller 11 is rotatably mounted in bearings in the lower ends of the two members 29, and a shaft 30 is rotatably mounted in bearings in the upper ends of the two members 29. The shaft 30 has a relatively small diameter compared to that of the roller 11 and is in rolling engagement with the surface of the roller 11, so that rotation of the roller causes rotation of the shaft at a much higher speed. One end of the shaft 30 is fitted with a disc 31 formed with apertures 32 around its periphery, and the member 29 adjacent the disc 31 is fitted with a magnetic sensor 33 of known construction operable to count the number of apertures 32 passing the sensor per unit of time upon rotation of the disc and thereby provide a measurement of the rotational speed of the roller 11.

A telescopic electrical potentiometer 35 of known construction is connected between the free end of one of the outer arms 26 on the swing frame and a bracket 36 secured on the trough, the potentiometer 35 being operable to provide an electrical output which corresponds to the angular setting of the swing frame relative to the trough 10, and thereby provide a measurement of the height of the roller 11 above the base 20 of the trough.

The roller discs 14 are secured on a shaft 40 which is rotatably mounted in journal blocks 41 mounted on the side rails 22 on the trough. The roller discs 14 are spaced from one another by collars 42 on the shaft 40, and the roller discs have a diameter such that their peripheries are spaced close to the base 20 of the trough 10. One end of the shaft 40 is fitted with a gear wheel 43 drivably connected by a chain 44 to a pinion 45 driven by a motor.

The vibratory conveyor 16 is mounted on a sub-frame 46 supported on the legs 23 on one side of the trough. The conveyor is of known construction and has therefore only been shown in outline. It is driven by an electric motor of variable speed and is operable to convey salt from the outlet of a hopper 47 to a spray head 48 positioned above the base of the trough 10 between the roller 11 and the roller discs 14. The rate of supply of salt from the hopper to the spray head is dependent on the speed of the motor.

The feed duct 17 is inclined upwardly towards the upstream end 13 of the trough 10 and terminates in an outlet portion 50 defining a rectangular outlet port for extrusion of curd into the trough. The outlet portion 50 of the feed duct has two side walls 51 which are aligned with and abut against the side walls 21 of the trough so that the width of the outlet port is substantially equal to the internal width of the trough. The base of the outlet portion 50 terminates at a level slightly above that of the upstream end of the base of the trough. The top of the outlet portion 50 comprises a plate 52 which is slidably mounted in guide rails 53 on the inside surfaces of the side walls 51. The front edge 54 of the plate 52 defines the top of the outlet port so that the total area of the outlet port can be adjusted by adjustment of the plate 52 along its guide rails 53. The plate 52 can be locked in any one of several longitudinal settings by a pin 55 engageable in aligned apertures 56 in one of the side walls 51, the adjacent guide rail 53, and the adjacent side wall of the plate. The rear end of the plate 52 has a cut-out providing a handgrip 57 to facilitate manual adjustment of the plate.

Figure 2:
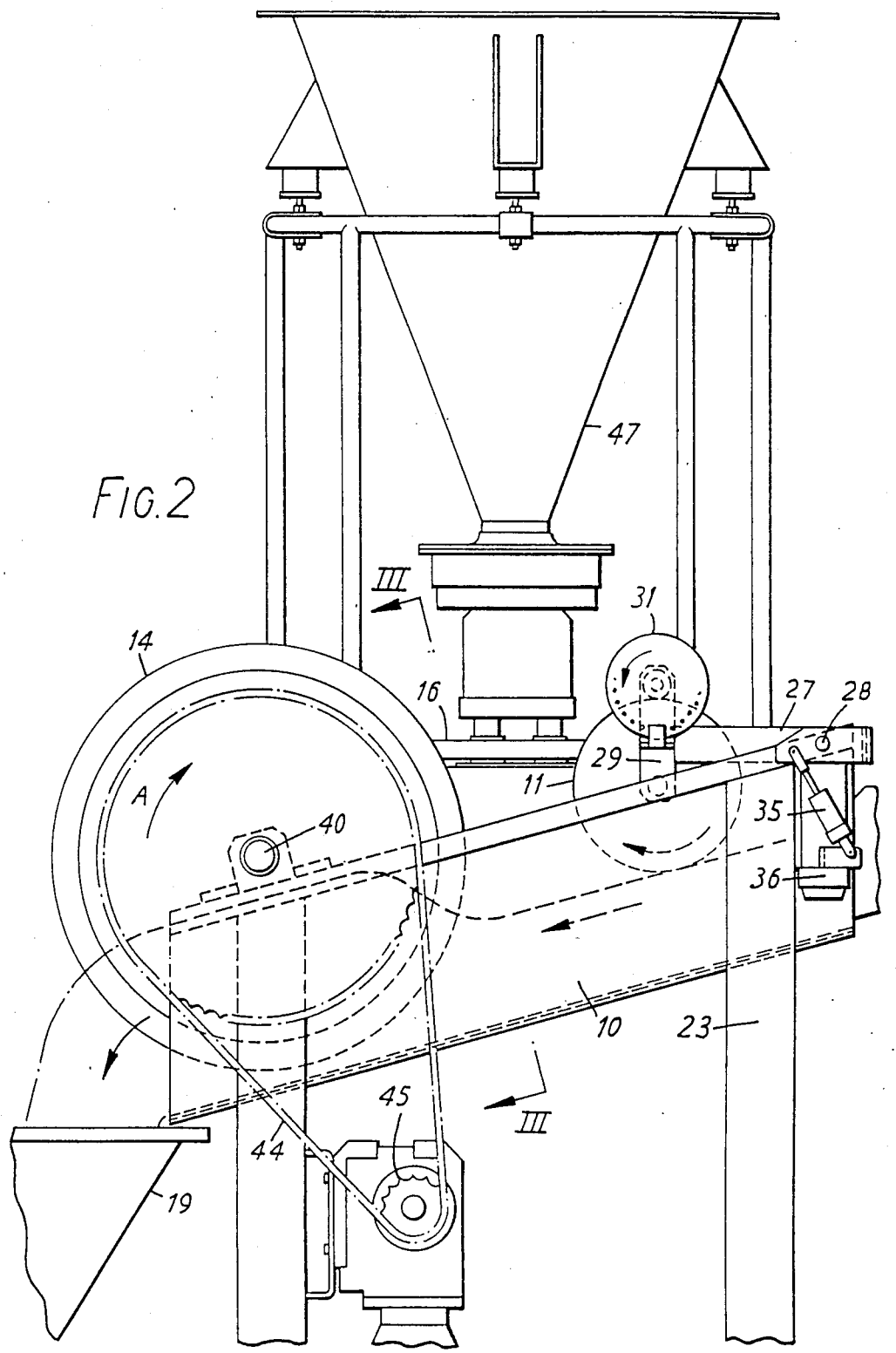
FIG. 2 is a side elevation view of the apparatus.
Figure 3:
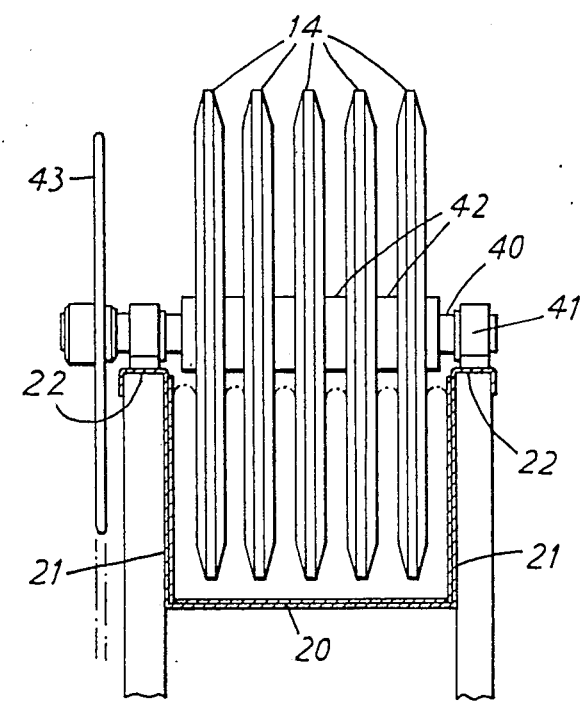
FIG. 3 is a cross sectional elevation view of part of the apparatus, taken along the line 111—111 in FIG. 2.

In operation, curd which has been kneaded, stretched and cooked is fed through the feed duct 17 by the augers 18 so that the curd is extruded through the outlet port at the upper end of the duct 17 and onto the trough 10. Since the width of the outlet port is substantially the same as that of the interior of the trough, the curd extends across the full width of the trough. The plate 52 is adjusted as necessary to enlarge or reduce the cross sectional area of the outlet port to accommodate the flow of curd. The roller 11 rides on the top of the curd so that its speed of rotation is a measure of the speed of travel of the curd along the trough, and the angular setting of the swing frame 25 is a measure of the height of the roller above the base of the trough and hence a measure of the thickness of the curd. The product of the thickness and speed of the curd provides, of course, a measure of the volumetric rate of flow of the curd. The magnetic sensor 33 provides an electric signal which is representative of the rotational speed of the roller 11, and the potentiometer 35 provides an electrical signal which is representative of the angular setting of the swing frame. These two signals are used to control the rate of supply of salt by the conveyor 16, by means well known in the art, so that the rate of supply of salt has a desired relationship to the volumetric rate of flow of the curd. The roller discs 14 are driven by the chain 44 in the direction shown by the arrow A in FIG. 2 so that the roller discs tend to draw the curd along the trough and also force the curd upwardly between the roller discs as shown in broken lines in FIG. 2. This deformation increases substantially the suface area of the curd, so that when the curd is finally discharged into the hopper 19, the salt is mixed more evenly throughout the curd.

I claim:

1. Apparatus for processing curd in the manufacture of cheese by the addition of salt to curd, which comprises a trough having a base for supporting a moving stream of curd having a width substantially equal to the width of said trough and a variable depth, a roller, inserted above said curd stream, bearing upon the surface of said stream and rotatable by movement of said stream, means for providing a first signal corresponding to the height of the roller above the base of the trough and therefore to the depth of the curd stream, means for providing a second signal corresponding to the rotational speed of said roller, dispensing means for dispensing salt into said curd stream and means responsive to said two signals for regulating the rate at which salt is dispensed from said dispensing means.

2. Apparatus for processing curd in the manufacture of cheese by the addition of salt to the curd, comprising a trough having a base and two side walls on opposite sides of the base, means for directing curd along said trough to form a moving stream of curd having a width equal to the distance between the side walls of the trough so that the volumetric rate of flow of the curd along the trough is determined by the speed of travel and depth of the curd in said stream, a roller and roller guide means positioning the roller in rolling engagement with the moving stream of curd so that the roller is rotatable by the moving stream of curd and the rotational speed of the roller is representative of the speed of travel of the curd along the trough, the roller guide means pemitting upward and downward movement of the roller in relation to the base of the trough so that the height of the roller above the base is representative of the depth of the stream of curd engaged by the roller, means providing a first signal corresponding to the height of the roller above the base of the trough, means providing a second signal corresponding to the rotational speed of the roller, dispensing means for dispensing salt into the stream of curd, and means responsive to said two signals for regulating the rate at which salt is dispensed from said dispensing means, whereby the salt is dispensed into the stream of curd in accordance with the volumetric rate of flow of curd along the trough.

3. Apparatus as claimed in claim 1, including a feed duct for supplying curd to the trough, the feed duct having an outlet orifice and means for extruding curd in the duct through said orifice and into the trough.

4. Apparatus as claimed in claim 2 in which said means for directing curd along said trough includes a feed duct for supplying curd to the trough, the feed duct having an outlet orifice and means for extruding curd in the duct through said orifice and into the trough, wherein the trough is substantially rectangular in transverse cross section with an internal width equal to the distance between said side walls, and the orifice is substantially rectangular with a width substantially equal to the internal width of the trough, whereby the stream of curd extruded through the orifice extends across substantially the full internal width of the trough and has a substantially constant cross section.

5. Apparatus as claimed in claim 4 or claim 3, wherein the feed duct comprises a top plate having an edge thereof defining the top edge of said orifice, and guide rails supporting the top plate for movement towards and away from the trough, whereby the total cross sectional area of the orifice may be adjusted by adjustment of the top plate along its guide walls.

6. Apparatus as claimed in claim 3, including power-driven rotary discs positioned in the trough downstream of the salting means, the discs being arranged to draw the curd along the trough and to deform the curd so as to distribute the salt within the curd upon rotation of the discs.

7. Apparatus as claimed in claim 1, wherein the trough is inclined downwards in the direction of flow of the curd along the trough.

8. Apparatus as claimed in claim 2, wherein said roller guide means comprises a swing frame pivotally mounted on the trough for angular movement relative to the trough, and the roller is rotatably mounted on the swing frame with the roller in rolling engagement with the stream of curd, the swing frame being arranged so that angular movement of the swing frame relative to the trough effects upward and downward movement of the roller to permit the roller to remain in contact with the stream of curd of varying depth, and the means for providing said first signal is adapted to provide an output corresponding to the angular setting of the swing frame relative to the trough.

9. Apparatus as claimed in claim 8, wherein the means for providing said first signal comprises an electrical potentiometer providing an electrical output corrresponding to the angular setting of the swing frame relative to the trough.

10. Apparatus as claimed in claim 1, wherein the means for providing said second signal comprises a disc drivably connected to the roller by step-up gearing, and electrical means measuring the speed of rotation of the disc.

11. Apparatus as claimed in claim 10, wherein the disc is mounted on a shaft in rolling engagement with the peripheral surface of the roller, the shaft having a relatively small diameter compared to that of the roller.

12. Apparatus as claimed in claim 10, wherein the disc is formed with apertures around its periphery, and said electrical means comprises a magnetic sensor operable to count the number of apertures passing the sensor per unit of time upon rotation of the disc.

* * * * *